US009220240B1

(12) United States Patent
Gooden et al.

(10) Patent No.: US 9,220,240 B1
(45) Date of Patent: Dec. 29, 2015

(54) ANIMAL WASTE COLLECTION BAG

(71) Applicants: Rainford Gooden, Arverne, NY (US);
Precious Gooden, Arverne, NY (US)

(72) Inventors: Rainford Gooden, Arverne, NY (US);
Precious Gooden, Arverne, NY (US)

( * ) Notice: Subject to any disclaimer, the term of this patent is extended or adjusted under 35 U.S.C. 154(b) by 0 days.

(21) Appl. No.: 14/684,820

(22) Filed: Apr. 13, 2015

(51) Int. Cl.
*A01K 29/00* (2006.01)
*A01K 23/00* (2006.01)

(52) U.S. Cl.
CPC ..................... *A01K 23/005* (2013.01)

(58) Field of Classification Search
CPC .. A01K 23/005; B65B 67/1255; B65D 33/02; B65D 33/16
USPC .......................... 294/1.5, 214; 383/12, 19, 33
See application file for complete search history.

(56) References Cited

U.S. PATENT DOCUMENTS

| | | | | |
|---|---|---|---|---|
| 3,578,236 A * | 5/1971 | Arai | ................................. | 383/33 |
| 3,848,841 A * | 11/1974 | Rafeldt | ........................... | 248/99 |
| 4,019,768 A * | 4/1977 | Niece | .............................. | 294/1.3 |
| 4,136,900 A * | 1/1979 | Thompson | ..................... | 294/1.5 |
| 4,185,861 A * | 1/1980 | Berner | ............................ | 294/1.5 |
| 5,961,167 A | 10/1999 | Gilley | | |
| 6,116,668 A | 9/2000 | Carpol | | |
| 6,641,187 B2 * | 11/2003 | Hsu | ............................... | 294/214 |
| 7,198,310 B1 * | 4/2007 | Lau | ................................. | 294/1.5 |
| 7,753,322 B1 * | 7/2010 | Peterson | ........................ | 248/99 |
| 8,201,862 B2 | 6/2012 | Langley | | |
| 2006/0113807 A1 * | 6/2006 | Lefevre | .......................... | 294/1.5 |

* cited by examiner

*Primary Examiner* — Dean Kramer
(74) *Attorney, Agent, or Firm* — Crossley Patent Law

(57) ABSTRACT

An animal waste collection bag including a foldable bag, a pair of vertical fold lines, a pair of horizontal fold lines, a plurality of interconnected pliable support frames having a front right support frame, a front left support frame, a rear right support frame, a rear left support frame, a front bottom support frame, a rear bottom support frame, a right bottom support frame, and a left bottom support frame. The animal waste collection bag further includes a pair of static handles having a right handle and a left handle. The right handle and the left handle are hingedly attached to a top edge of each of a rear right edge and a rear left edge, respectively.

8 Claims, 5 Drawing Sheets

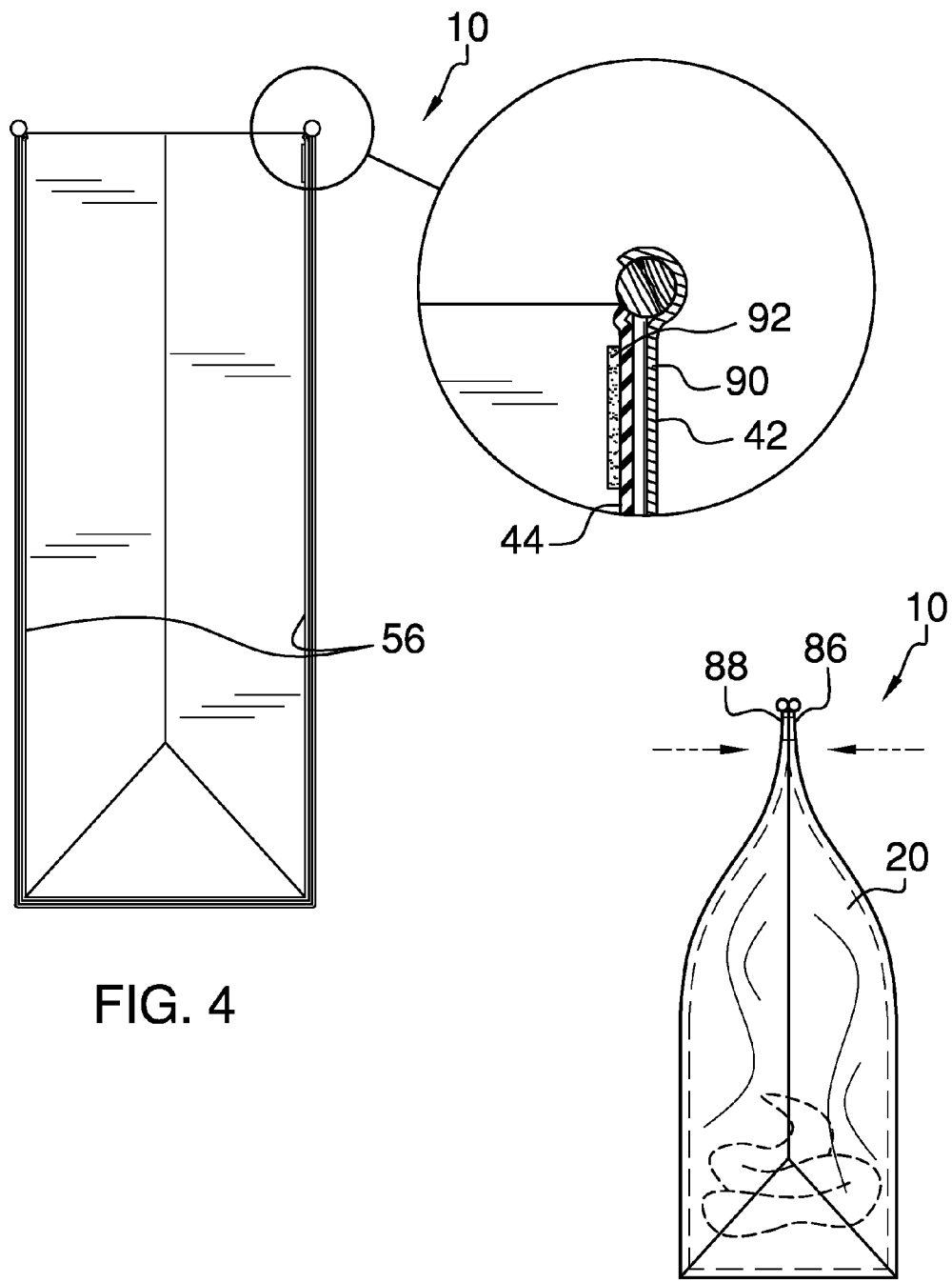

ANIMAL WASTE COLLECTION BAG

BACKGROUND OF THE INVENTION

Various types of waste collection bags are known in the prior art. However, what has been needed is an animal waste collection bag including a foldable bag, having a right side, a left side, a front side, a rear side, a front right edge, a front left edge, a rear right edge, and a rear left edge. What has been further needed is a pair of vertical fold lines, a pair of horizontal fold lines, a plurality of interconnected pliable support frames, and a pair of static handles having a right handle and a left handle. Lastly, what has been needed is for each of the right handle and the left handle to be hingedly attached to a top edge of each of the rear right edge and the rear left edge, respectively, with a front half of each of the right handle and the left handle continuously disposed along a top surface of each of the right side and the left side, respectively. The animal waste collection bag thus allows a user to handle and dispose of solid waste from an animal in a more convenient and sanitary manner. The animal waste collection bag is also foldable for ease of storage and travel.

FIELD OF THE INVENTION

The present invention relates to waste collection bags, and more particularly, to an animal waste collection bag.

SUMMARY OF THE INVENTION

The general purpose of the present animal waste collection bag, described subsequently in greater detail, is to provide a waste collection bag which has many novel features that result in an animal waste collection bag which is not anticipated, rendered obvious, suggested, or even implied by prior art, either alone or in combination thereof.

To accomplish this, the present animal waste collection bag comprises a foldable bag having a right side, a left side, a front side, a rear side, a front right edge, a front left edge, a rear right edge, and a rear left edge. Each of the right side, the left side, the front side, and the rear side has a top surface, a bottom surface, an external surface, and an internal surface. Each of the front right edge, the front left edge, the rear right edge, and the rear left edge has a top edge and a bottom edge. A pair of vertical fold lines comprises a front vertical fold line and a rear vertical fold line. The front vertical fold line and the rear vertical fold line are medially disposed on the front side of the bag and the rear side of the bag, respectively, from the top surface to the bottom surface. A pair of horizontal fold lines comprises a front horizontal fold line and a rear horizontal fold line. The front horizontal fold line and the rear horizontal fold line are triangularly disposed on the bag front side and the bag rear side, respectively, from the bottom edge of the front left edge to the bottom edge of the front right edge, and from the bottom edge of the rear left edge to the bottom edge of the rear right edge, respectively.

The animal waste collection bag further comprises a plurality of interconnected pliable support frames having a front right support frame, a front left support frame, a rear right support frame, a rear left support frame, a front bottom support frame, a rear bottom support frame, a right bottom support frame, and a left bottom support frame. The front right support frame is continuously disposed along the front right edge, the front left support frame is continuously disposed along the front left edge, the rear right support frame is continuously disposed along the rear right edge, the rear left support frame is continuously disposed along the rear left edge, the front bottom support frame is continuously disposed along the bottom surface of the front side, the rear bottom support frame is continuously disposed along the bottom surface of the rear side, the right bottom support frame is continuously disposed along the bottom surface of the right side, and the left bottom support frame is continuously disposed along the bottom surface of the left side.

The animal waste collection bag further comprises a pair of static handles. The pair of handles comprises a right handle and a left handle. Each of the right handle and the left handle has a front half and a back half. The right handle and the left handle are hingedly attached to the top edge of each of the rear right edge and the rear left edge, respectively. The front half of each of the right handle and the left handle is continuously disposed along the top surface of each of the right side and the left side, respectively.

The animal waste collection bag can optionally further comprise a pair of interconnectable hook and loop fasteners. The pair of hook and loop fasteners comprises a first strip and a second strip. The first strip is disposed on the internal surface of the right side proximal the top surface of the right side, and the second strip is disposed on the internal surface of the left side proximal the top surface of the left side. The pair of hook and loop fasteners is configured to secure the left side of the bag with the right side of the bag.

The animal waste collection bag can also optionally comprise an outer layer and an inner layer. The outer layer can optionally be paper. The inner layer can optionally be plastic.

Thus has been broadly outlined the more important features of the present animal waste collection bag so that the detailed description thereof that follows may be better understood and in order that the present contribution to the art may be better appreciated.

BRIEF DESCRIPTION OF THE DRAWINGS

Figures

FIG. 4 is a cross-sectional view taken along line 4-4 of FIG. 3.
FIG. 5 is an in-use view showing a bag in a closed position.

DETAILED DESCRIPTION OF THE DRAWINGS

Figure 1:
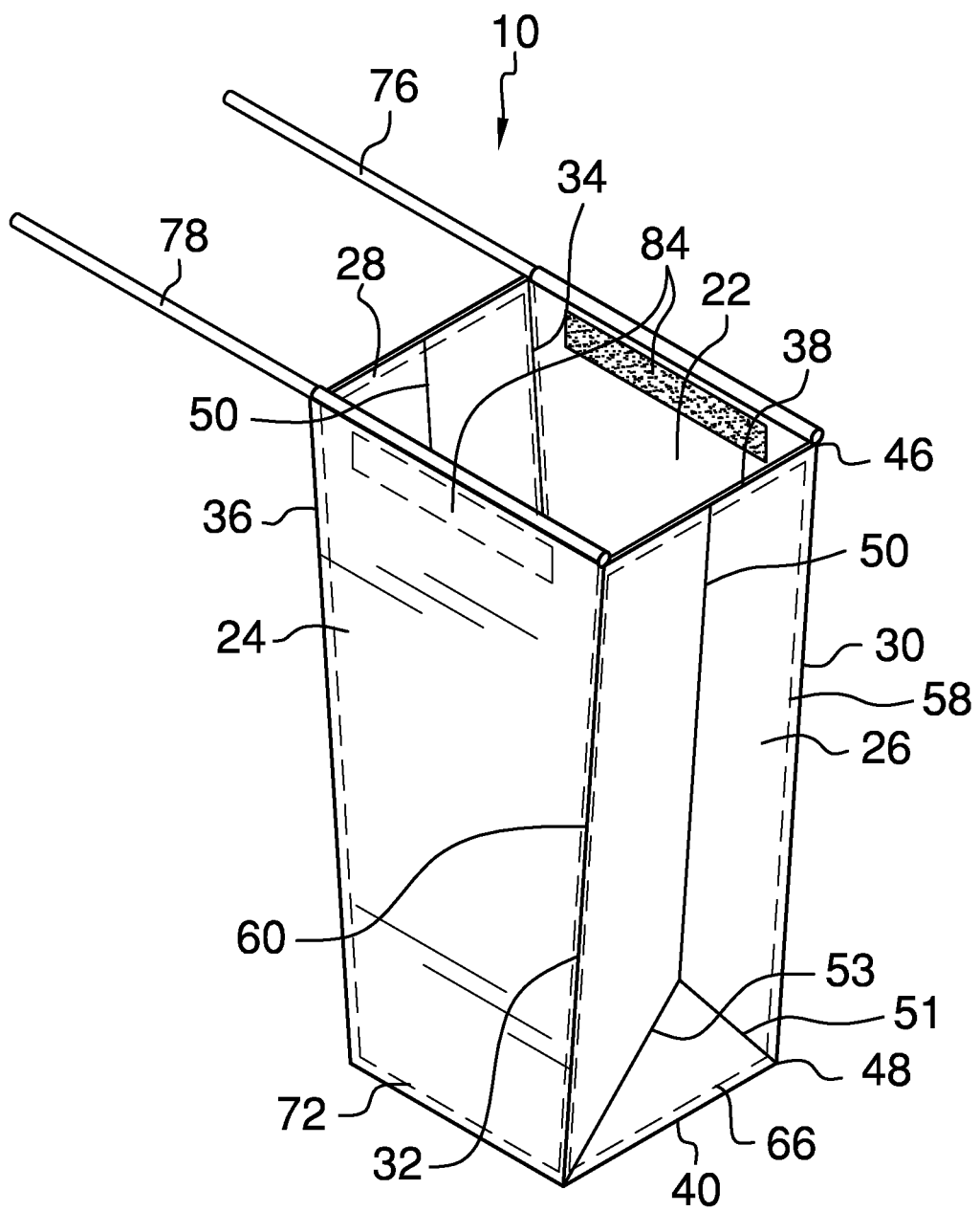
FIG. 1 is a front isometric view.
Figure 2:
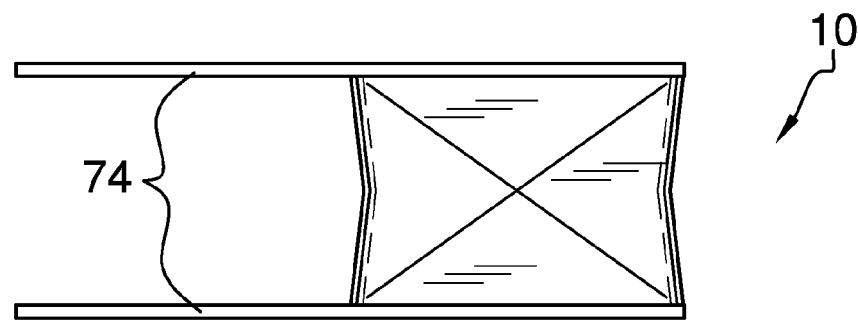
FIG. 2 is a top plan view.
Figure 3:
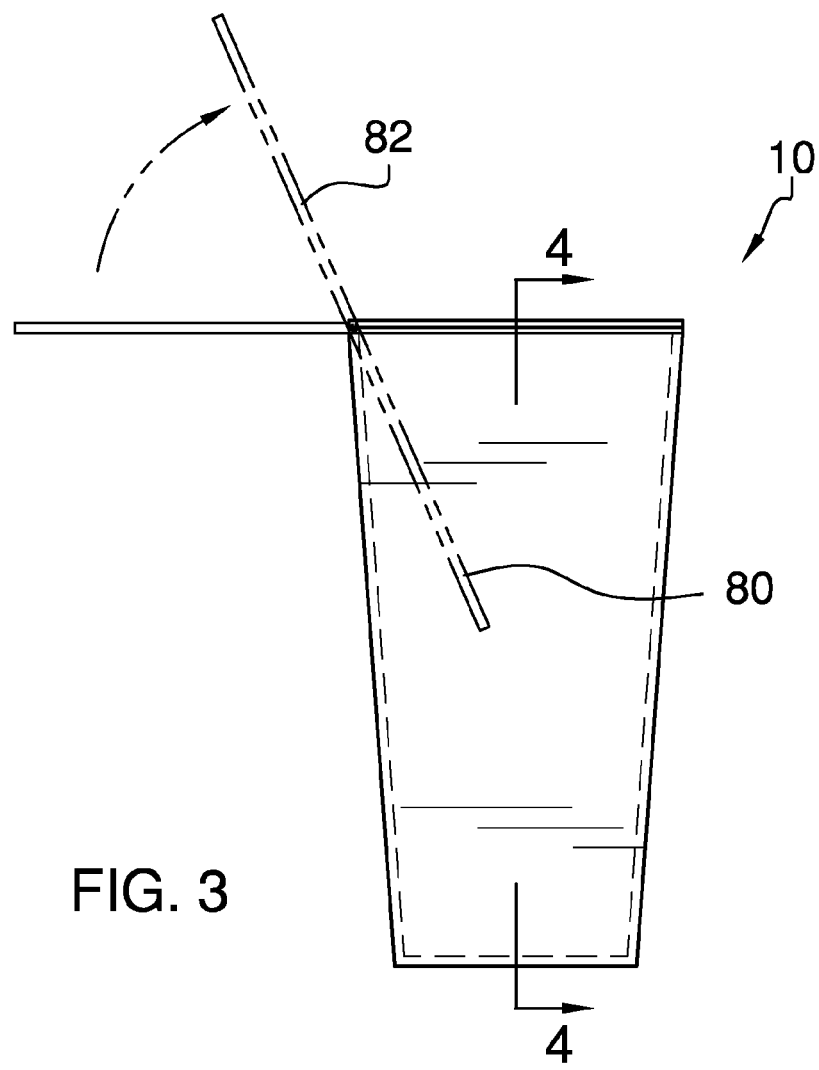
FIG. 3 is a side elevation view.
Figure 6:
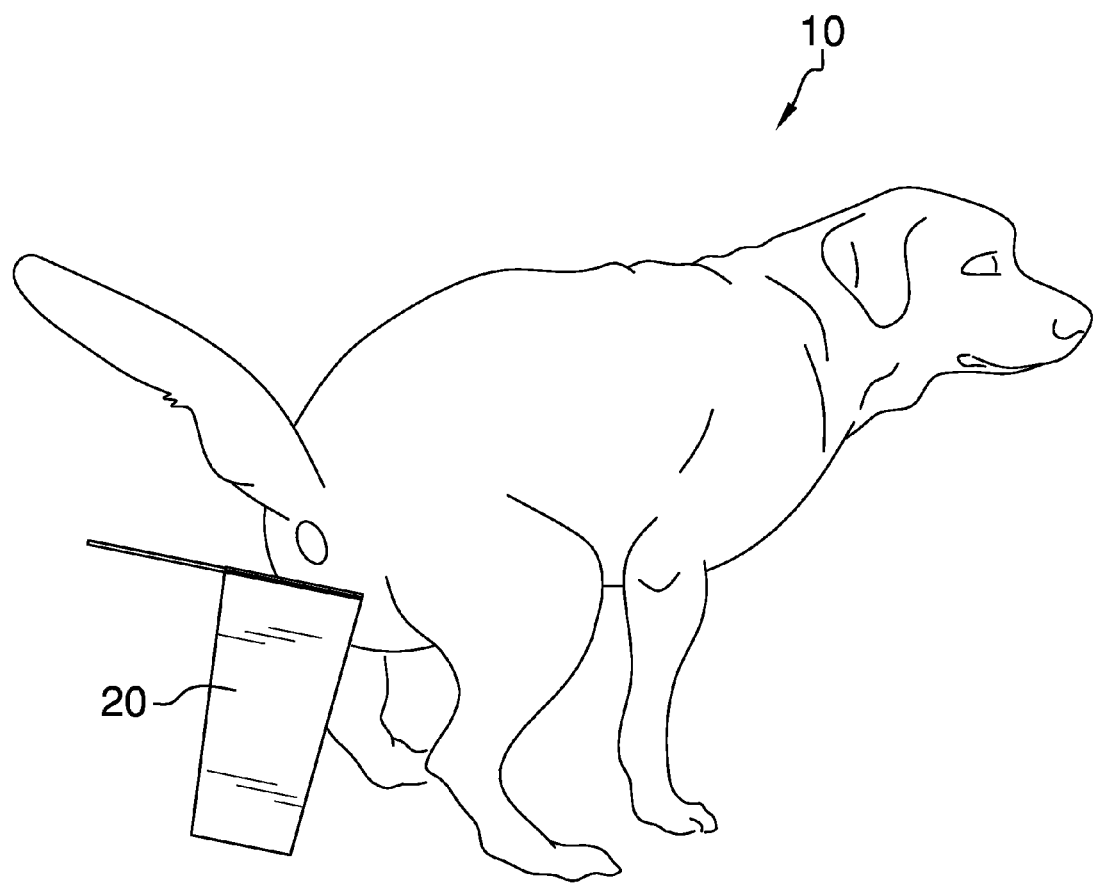
FIG. 6 is an in-use view showing the bag in an open position.
Figure 7:
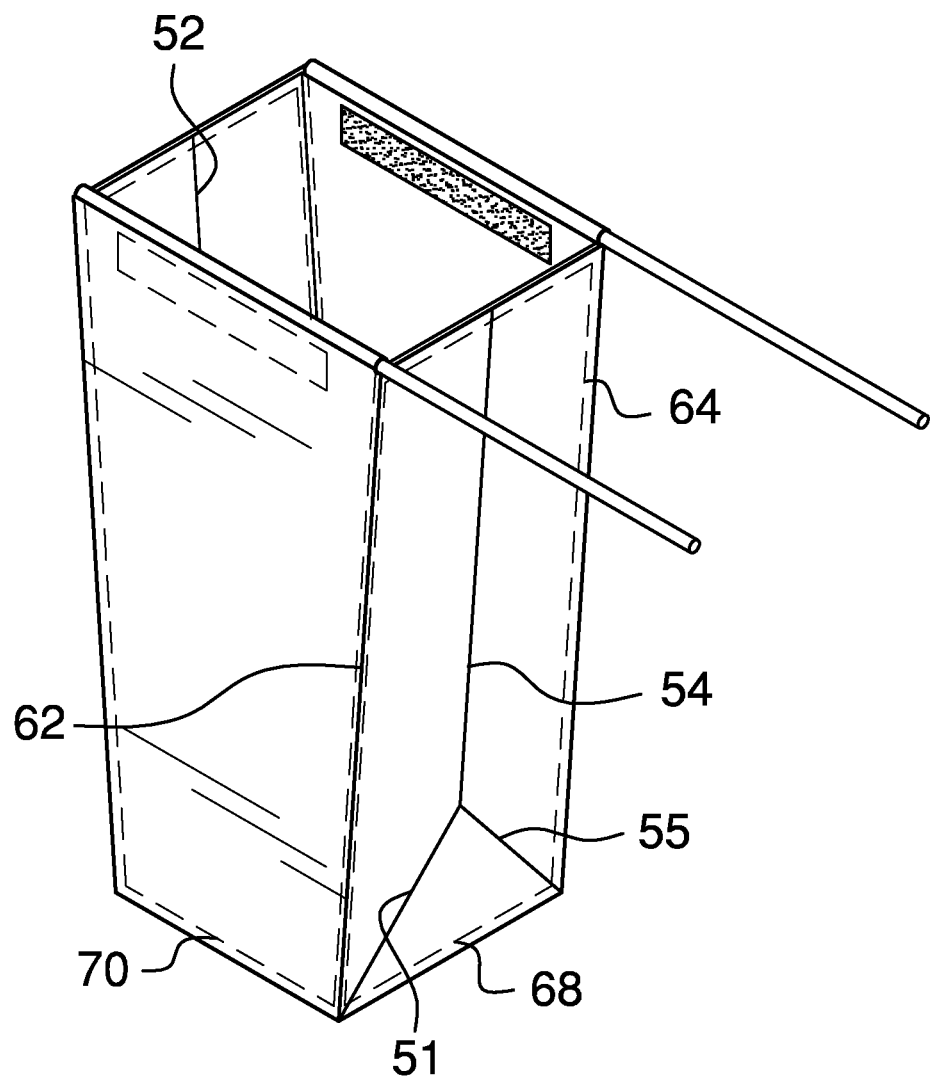
FIG. 7 is a rear isometric view.

With reference now to the drawings, and in particular FIGS. 1 through 7 thereof, an example of the instant animal waste collection bag employing the principles and concepts of the present animal waste collection bag and generally designated by the reference number 10 will be described.

Referring to FIGS. 1 through 7 the present animal waste collection bag 10 is illustrated. The animal waste collection bag 10 comprises a foldable bag 20 having a right side 22, a left side 24, a front side 26, a rear side 28, a front right edge 30, a front left edge 32, a rear right edge 34, and a rear left edge 36. Each of the right side 22, the left side 24, the front side 26, and the rear side 28 has a top surface 38, a bottom surface 40, an external surface 42, and an internal surface 44. Each of the front right edge 30, the front left edge 32, the rear right edge 34, and the rear left edge 36 has a top edge 46 and a bottom edge 48. A pair of vertical fold lines 50 comprises a front vertical fold line 52 and a rear vertical fold line 54. The front vertical fold line 52 and the rear vertical fold line 54 are medially disposed on the front side 26 of the bag 20 and the rear side 28 of the bag 20, respectively, from the top surface 38 to the bottom surface 40. A pair of horizontal fold lines 51 comprises a front horizontal fold line 53 and a rear horizontal fold line 55. The front horizontal fold line 53 and the rear horizontal fold line 55 are triangularly disposed on the front side 26 of the bag 20 and the rear side 28 of the bag 20, respectively, from the bottom edge 48 of the front left edge 32 to the bottom edge 48 of the front right edge 30, and from the bottom edge 48 of the rear left edge 36 to the bottom edge 48 of the rear right edge 34, respectively.

The animal waste collection bag 10 further comprises a plurality of interconnected pliable support frames 56 having a front right support frame 58, a front left support frame 60, a rear right support frame 62, a rear left support frame 64, a front bottom support frame 66, a rear bottom support frame 68, a right bottom support frame 70, and a left bottom support frame 72. The front right support frame 58 is continuously disposed along the front right edge 30, the front left support frame 60 is continuously disposed along the front left edge 32, the rear right support frame 62 is continuously disposed along the rear right edge 34, the rear left support frame 64 is continuously disposed along the rear left edge 36, the front bottom support frame 66 is continuously disposed along the bottom surface 40 of the front side 26, the rear bottom support frame 68 is continuously disposed along the bottom surface 40 of the rear side 28, the right bottom support frame 70 is continuously disposed along the bottom surface 40 of the right side 22, and the left bottom support frame 72 is continuously disposed along the bottom surface 40 of the left side 24.

The animal waste collection bag 10 further comprises a pair of static handles 74. The pair of handles 74 comprises a right handle 76 and a left handle 78. Each of the right handle 76 and the left handle 78 has a front half 80 and a back half 82. The right handle 76 and the left handle 78 are hingedly attached to the top edge 46 of each of the rear right edge 34 and the rear left edge 36, respectively. The front half 80 of each of the right handle 76 and the left handle 78 is continuously disposed along the top surface 38 of each of the right side 22 and the left side 24, respectively.

As best shown in FIG. 1, the animal waste collection bag 10 can optionally further comprise a pair of interconnectable hook and loop fasteners 84. The pair of hook and loop fasteners 84 comprises a first strip 86 and a second strip 88. The first strip 86 is disposed on the internal surface 44 of the right side 22 proximal the top surface 38 of the right side 22, and the second strip 88 is disposed on the internal surface 44 of the left side 24 proximal the top surface 38 of the left side 24.

The animal waste collection bag 10 can also optionally comprise an outer layer 90 and an inner layer 92.

What is claimed is:

1. An animal waste collection bag comprising:
a foldable bag having a right side, a left side, a front side, a rear side, a front right edge, a front left edge, a rear right edge, and a rear left edge, each of the right side, the left side, the front side, and the rear side having a top surface, a bottom surface, an external surface, and an internal surface, each of the front right edge, the front left edge, the rear right edge, and the rear left edge having a top edge and a bottom edge;
a pair of vertical fold lines comprising a front vertical fold line and a rear vertical fold line, wherein the front vertical fold line and the rear vertical fold line are medially disposed on the bag front side and the bag rear side, respectively, from the top surface to the bottom surface;
a pair of horizontal fold lines comprising a front horizontal fold line and a rear horizontal fold line, wherein the front horizontal fold line and the rear horizontal fold line are triangularly disposed on the bag front side and the bag rear side, respectively, from the bottom edge of the front left edge to the bottom edge of the front right edge and from the bottom edge of the rear left edge to the bottom edge of the rear right edge, respectively;
a plurality of interconnected pliable support frames comprising a front right support frame, a front left support frame, a rear right support frame, a rear left support frame, a front bottom support frame, a rear bottom support frame, a right bottom support frame, and a left bottom support frame; wherein the front right support frame is continuously disposed along the front right edge, the front left support frame is continuously disposed along the front left edge, the rear right support frame is continuously disposed along the rear right edge, the rear left support frame is continuously disposed along the rear left edge, the front bottom support frame is continuously disposed along the front side bottom surface, the rear bottom support frame is continuously disposed along the rear side bottom surface, the right bottom support frame is continuously disposed along the right side bottom surface, and the left bottom support frame is continuously disposed along the left side bottom surface; and
a pair of static handles comprising a right handle and a left handle, each of the right handle and the left handle having a front half and a back half, wherein the right handle and the left handle are hingedly attached to the top edge of each of the rear right edge and the rear left edge, respectively, wherein the front half of each of the right handle and the left handle is continuously disposed along the top surface of each of the right side and the left side, respectively.

2. The animal waste collection bag of claim 1 further comprising:
a pair of interconnectable hook and loop fastener strips comprising a first strip and a second strip, wherein the first strip is disposed on the internal surface of the right side proximal the right side top surface, and the second strip is disposed on the internal surface of the left side proximal the left side top surface;
wherein the pair of hook and loop fastener strips is configured to secure the left side of the bag with the right side of the bag.

3. The animal waste collection bag of claim 2 wherein the bag further comprises an outer layer and an inner layer.

4. The animal waste collection bag of claim 3 wherein the outer layer is paper.

5. The animal waste collection bag of claim 4 wherein the inner layer is plastic.

6. The animal waste collection bag of claim 1 wherein the bag comprises an outer layer and an inner layer.

7. The animal waste collection bag of claim 6 wherein the outer layer is paper.

8. The animal waste collection bag of claim 7 wherein the inner layer is plastic.

* * * * *